(12) United States Patent
Ko et al.

(10) Patent No.: US 9,484,586 B2
(45) Date of Patent: Nov. 1, 2016

(54) DRIVING CONTROL METHOD AND SYSTEM OF FUEL CELL SYSTEM

(71) Applicant: Hyundai Motor Company, Seoul (KR)

(72) Inventors: Jae Jun Ko, Gyeonggi-Do (KR); Kwi Seong Jeong, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 120 days.

(21) Appl. No.: 14/554,228

(22) Filed: Nov. 26, 2014

(65) Prior Publication Data

US 2016/0020474 A1 Jan. 21, 2016

(30) Foreign Application Priority Data

Jul. 15, 2014 (KR) .................. 10-2014-0089017

(51) Int. Cl.
 *H01M 8/04* (2016.01)

(52) U.S. Cl.
 CPC ....... *H01M 8/04104* (2013.01); *H01M 8/0432* (2013.01); *H01M 8/04753* (2013.01); *H01M 8/04783* (2013.01); *H01M 8/04992* (2013.01); *H01M 2250/20* (2013.01); *Y02E 60/50* (2013.01); *Y02T 90/32* (2013.01)

(58) Field of Classification Search
 CPC .................. H01M 8/04082; H01M 8/04089; H01M 8/04104; H01M 8/04253; H01M 8/0432; H01M 8/04388; H01M 8/04753; H01M 2250/20

See application file for complete search history.

(56) References Cited

U.S. PATENT DOCUMENTS

| | | | |
|---|---|---|---|
| 2003/0039870 A1* | 2/2003 | Busenbender .... | H01M 8/04007 429/429 |
| 2010/0203411 A1* | 8/2010 | Hasuka ............. | H01M 8/04156 429/442 |

FOREIGN PATENT DOCUMENTS

| | | |
|---|---|---|
| JP | 2004-127914 A | 4/2004 |
| JP | 2004-179034 A | 6/2004 |
| JP | 2004-311288 A | 11/2004 |
| JP | 2006-147335 A | 6/2006 |
| JP | 2006-164675 A | 6/2006 |
| JP | 2007-035464 A | 2/2007 |
| KR | 10-2013-0040357 A | 4/2013 |

\* cited by examiner

*Primary Examiner* — Carlos Barcena
(74) *Attorney, Agent, or Firm* — Mintz Levin Cohn Ferris Glovsky and Popeo, P.C.; Peter F. Corless (57) ABSTRACT

A driving control method and system of a fuel cell system are provided. The method includes monitoring an exterior temperature. In addition, the method includes increasing hydrogen pressure at an anode side of a fuel cell stack when the exterior temperature is less than a preset exterior temperature during the monitoring.

14 Claims, 9 Drawing Sheets

FIG. 1

Related Art

FIG. 2

Related Art

DRIVING CONTROL METHOD AND SYSTEM OF FUEL CELL SYSTEM

CROSS REFERENCE TO RELATED APPLICATION

The present application claims priority of Korean Patent Application Number 10-2014-0089017 filed on Jul. 15, 2014, the entire contents of which application are incorporated herein for all purposes by this reference.

BACKGROUND

1. Technical Field

The present invention relates to a driving control method and system of a fuel cell system, and more particularly, to a driving control method of a fuel cell system capable of improving cold start performance by adjusting hydrogen pressure at an anode side.

2. Description of the Related Art

A fuel cell system used for a hydrogen fuel cell vehicle, which is a type of environment-friendly vehicles, is configured to include a fuel cell stack that generate electrical energy from an electrochemical reaction of reaction gases, a hydrogen supplying apparatus that supply hydrogen, which is fuel, to the fuel cell stack, an air supplying apparatus that supplies air including oxygen, which is an oxidizer necessary to perform the electrochemical reaction to the fuel cell stack, and a heat and water managing system that optimally adjusts a driving temperature of the fuel cell stack by discharging heat, which is a by-product of the electrochemical reaction of the fuel cell stack to the exterior and performing a water managing function.

A polymer film of the fuel cell stack should secure ion conductivity to increase performance of electrochemical reaction of hydrogen and water. As a degree of hydrolysis is increased, a reaction ratio of hydrogen and water is increased. Therefore, the hydrogen supplying apparatus has a hydrogen re-circulation system and the air supplying apparatus has a humidifier. However, water generated by a reaction with water supplied by humidification is frozen in a fuel cell when a temperature of the fuel cell decreases to 0° C. or less. When water remaining in the fuel cell is changed to an ice state, a volume thereof is expanded thus causing potential damage to a membrane electrode assembly and a gas diffusion layer having a pore structure. In addition, upon cold-starting, the generated water is frozen in an electrode of the fuel cell and is not discharged until it is thawed. The ice that is not discharged blocks a moving passage of reaction gas. To more stably drive the fuel cell vehicle after being cold-started, the ice is required to be thawed before the moving passage of the reaction gas in the fuel cell is fully blocked. Accordingly, an amount of water present in the fuel cell is required to be decreased before being cold-started.

Figure 1:
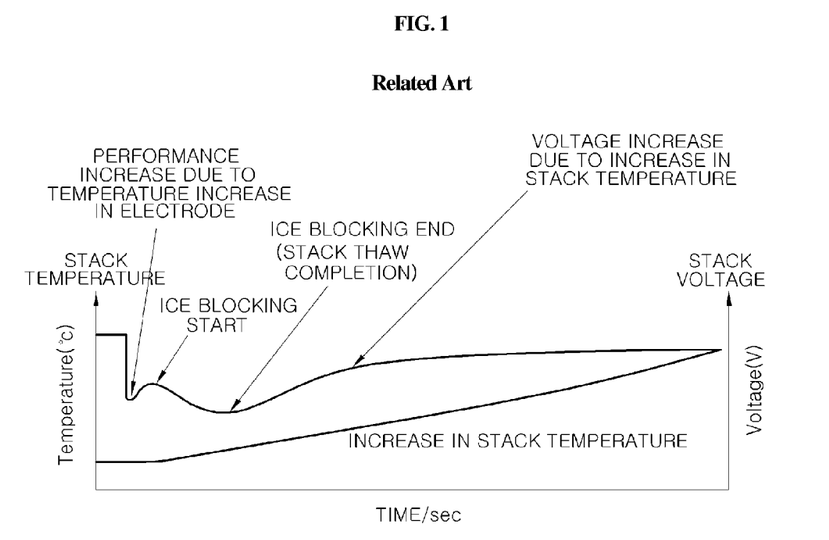
FIG. 1 is an exemplary graph illustrating a change according to a temperature of a fuel cell stack and a time of an output of the fuel cell stack according to the related art.

FIG. 1 is an exemplary graph illustrating a change according to a temperature of a fuel cell stack and a time of an output of the fuel cell stack. Referring to FIG. 1, the temperature of the fuel cell stack is continuously increased as time passes. However, as shown in FIG. 1, as the temperature of the fuel cell stack is increased, a voltage of the fuel cell stack is increased, and during an ice blocking phenomenon, that is, a phenomenon in which the generated water is frozen to block the moving passage of the reaction gas, occurs, the voltage of the fuel cell stack is decreased. When the temperature of the fuel cell stack is increased to complete the thaw of the fuel cell stack, the voltage of the fuel cell stack is increased based on the increase in the temperature of the fuel cell stack.

To decrease the amount of water present in the fuel cell stack before being cold-started, the remaining water in the fuel cell during the driving is maintained to a predetermined amount or less or the water is removed through purge after being shut-down. By the above-mentioned process, the time in which the ice blocking phenomenon is observed upon being cold-started may be delayed, and a phenomenon in which a channel, which is the moving passage of the reaction gas, is blocked by the ice may be mitigated. To measure the amount of water present in the fuel cell, a method of measuring resistance in the fuel cell and a method of using experimental data obtained from a driving environment of the fuel cell stack may be used.

Meanwhile, when a driving temperature of the fuel cell is substantially low, saturated vapor pressure of an outlet portion of the fuel cell stack is substantially low. Therefore, an amount of discharged water is decreased, to increase an amount of remaining water. Therefore, a flooding phenomenon occurs in the fuel cell stack, thus increasing the amount of water to be removed.

Figure 2:
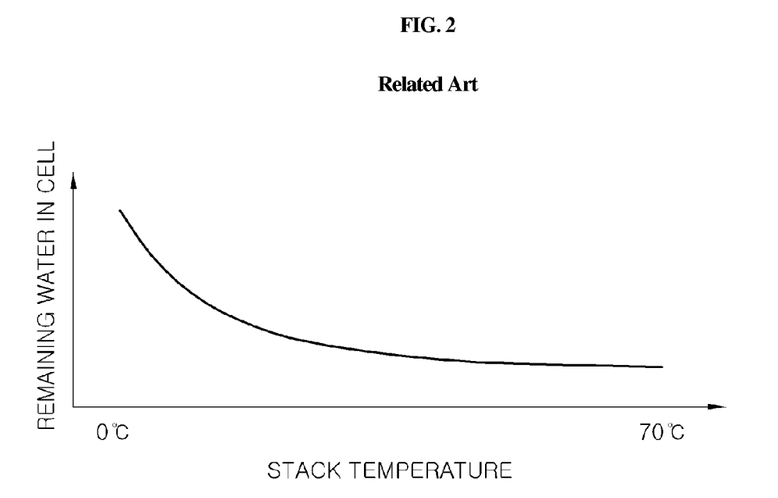
FIG. 2 is an exemplary graph illustrating a change in an amount of water remaining in the fuel cell according to the temperature of the fuel cell stack according to the related art.

FIG. 2 is an exemplary graph illustrating a change in an amount of water remaining in the fuel cell according to the temperature of the fuel cell stack. As illustrated in FIG. 2, as the temperature of the fuel cell stack is decreased, the amount of water remaining in the fuel cell stack is increased. Water remaining in a cathode and an anode prevents formation of a stack voltage upon being cold-started, thereby suppressing heating in the cell. Particularly, when the voltage of the fuel cell stack upon being cold-started decreases to below a minimum reference voltage based on the water remaining at the anode side, carbon in catalyst is changed to carbon dioxide in an anode electrode, such that a catalyst amount may be decreased.

SUMMARY

The present invention provides a driving control method of a fuel cell system capable of improving cold start performance and cold driving performance by adjusting pressure at an anode side depending on a situation.

According to an exemplary embodiment of the present invention, a driving control method of a fuel cell system may include: monitoring an exterior temperature; and increasing hydrogen pressure at an anode side of a fuel cell stack when the exterior temperature is less than a preset exterior temperature during the monitoring.

The driving control method may further include, after the increasing of the hydrogen pressure, adjusting a difference between the hydrogen pressure at the anode side and air pressure at a cathode side to a preset pressure or less when a temperature of the fuel cell stack is greater than a preset stack temperature. In addition, the driving control method may include, after the adjusting of the difference, re-increasing the hydrogen pressure at the anode side of the fuel cell stack when the exterior temperature is less than the preset outdoor temperature when a fuel cell vehicle is stopped.

In the increasing of the hydrogen pressure, the hydrogen pressure at the anode side may be increased to an allowable maximum value. In the re-increasing of the hydrogen pressure, the hydrogen pressure at the anode side may be re-increased to an allowable maximum value. In addition, in the increasing of the hydrogen pressure, the hydrogen pressure at the anode side may be increased so that the difference between the hydrogen pressure at the anode side and air pressure at a cathode side may be maintained to a preset first pressure. In the increasing of the hydrogen pressure, the hydrogen pressure at the anode side may be increased so that the difference between the hydrogen pressure at the anode side and air pressure at a cathode side may be changed based on a temperature of the fuel cell stack. In the increasing of the hydrogen pressure, the hydrogen pressure may be increased so that the difference between the hydrogen pressure at the anode side and the air pressure at the cathode side may be decreased as the temperature of the fuel cell stack is increased.

Further, in the increasing of the hydrogen pressure, the hydrogen pressure may be increased so that the difference between the hydrogen pressure at the anode side and the air pressure at the cathode side becomes a maximum value when the temperature of the fuel cell stack is less than the preset stack temperature. In the increasing of the hydrogen pressure, the hydrogen pressure at the anode side may be increased so that the difference between the hydrogen pressure at the anode side and air pressure at a cathode side is changed based on an internal resistance value of the fuel cell stack. In the increasing of the hydrogen pressure, the hydrogen pressure may be increased so that the difference between the hydrogen pressure at the anode side and air pressure at a cathode side is increased as the internal resistance value of the fuel cell stack becomes less than a preset reference internal resistance value. Additionally, in the increasing of the hydrogen pressure, the hydrogen pressure may be increased so that the difference between the hydrogen pressure at the anode side and air pressure at a cathode side becomes a maximum value when the internal resistance value of the fuel cell stack becomes less than a preset reference internal resistance value at a predetermined ratio or less.

BRIEF DESCRIPTION OF THE DRAWINGS

The above and other features of the present invention will now be described in detail with reference to various exemplary embodiments thereof illustrated the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific descriptions on structure and function of embodiments of the present invention described herein are merely illustrative and not construed to limit the invention thereto. Since the present invention may be variously modified and have several exemplary embodiments, specific exemplary embodiments will be shown in the accompanying drawings and be described in detail. However, it is to be understood that the present invention is not limited to the specific exemplary embodiments, but includes all modifications, equivalents, and substitutions included in the spirit and the scope of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between," "directly between," "neighboring to," "directly neighboring to" and the like, should be similarly interpreted.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in detail with reference to the accompanying drawings. Like reference numerals denote like components throughout the drawings.

Figure 3:
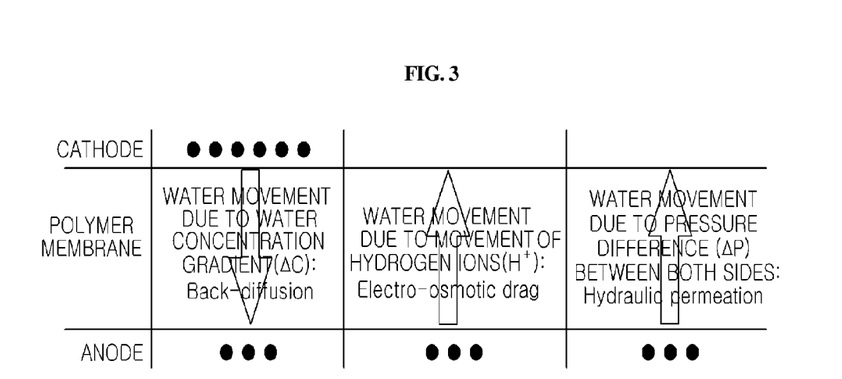
FIG. 3 is an exemplary view describing a water moving mechanism between a cathode and an anode of the fuel cell stack according to an exemplary embodiment of the present invention.

FIG. 3 is an exemplary view describing a water moving mechanism between a cathode and an anode of the fuel cell stack. A water movement in a fuel cell configuring the fuel cell stack may be performed by three mechanisms as illustrated in FIG. 3. First, the water may be moved by a concentration difference in the water, may be moved together with hydrogen ions moved from the anode to the cathode, and may be moved by a pressure difference between the anode and the cathode.

Figure 4:
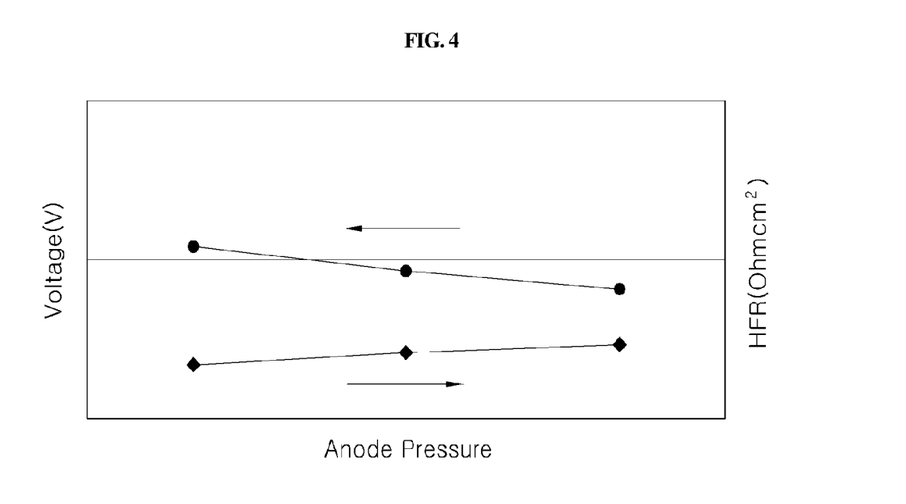
FIG. 4 is an exemplary graph illustrating changes in a voltage and an internal resistance according to a pressure increase in the anode of the fuel cell stack according to an exemplary embodiment of the present invention.

FIG. 4 is an exemplary graph illustrating changes in a voltage and an internal resistance according to a pressure increase in the anode of the fuel cell stack. A voltage of a left y axis may be determined as performance of the fuel cell stack and high frequency resistance (HFR) of a right y axis may indicate an internal resistance value of the fuel cell stack as high frequency resistance.

Measurements of FIG. 4 are values obtained by applying air pressure of the cathode as outlet reference atmospheric pressure. In particular, it may be appreciated that as hydrogen pressure in the anode is increased, the voltage of the fuel cell stack is decreased and the internal resistance value is increased. In other words, as the hydrogen pressure is increased, performance of the fuel cell stack may be decreased. The internal resistance value may have an inverse proportion relationship with remaining water in the fuel cell. In other words, as the remaining water is decreased, the internal resistance value is increased, and as the remaining water is increased, the internal resistance value is decreased.

An amount of remaining water is determined by the measured internal resistance value. For example, as the hydrogen pressure in the anode is increased, the remaining water in the fuel cell is decreased.

Figure 5A:
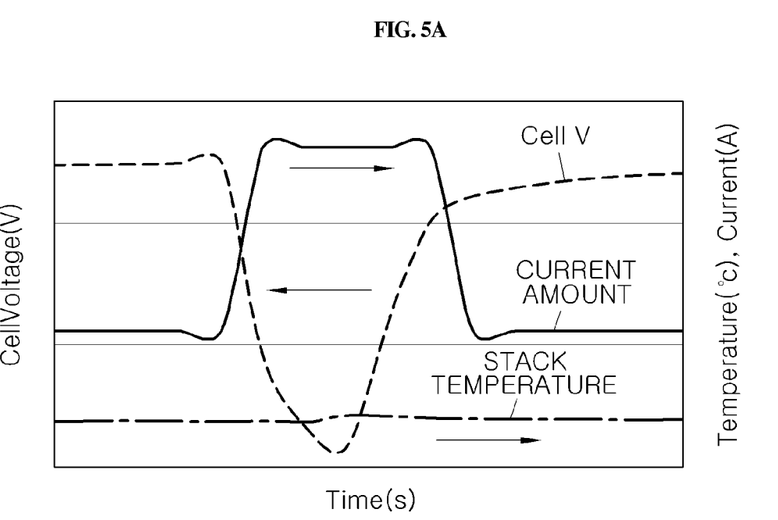
FIGS. 5A and 5B are exemplary graphs illustrating a voltage, a current amount, and a temperature change of the fuel cell stack according to a pressure difference between the anode and the cathode of the fuel cell stack according to an exemplary embodiment of the present invention.
Figure 5B:
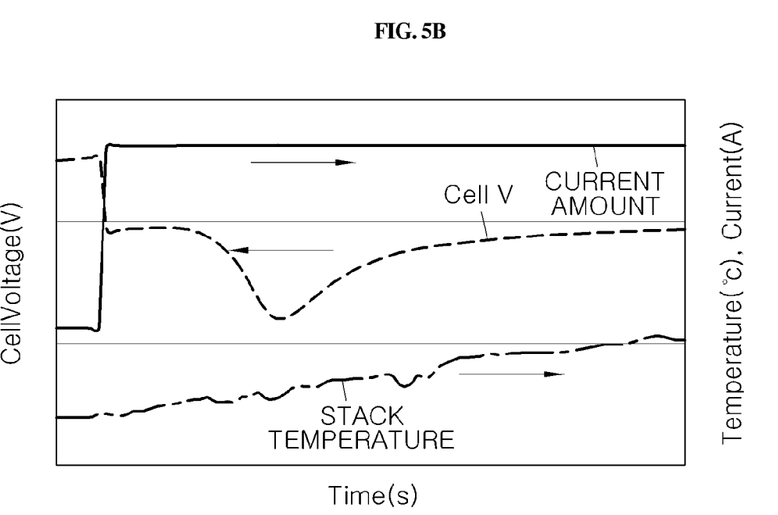

FIGS. 5A and 5B are exemplary graphs illustrating a voltage, a current amount, and a temperature change of the fuel cell stack according to a pressure difference between the anode and the cathode of the fuel cell stack. Measurements of FIGS. 5A and 5B are results obtained by performing a cold start experiment at about 20 degrees below zero. FIGS. 5A and 5B show results obtained by adjusting a difference between the hydrogen pressure in the anode and air pressure in the cathode to about 5 kPa and 50 kPa, respectively, driving the fuel cell stack until a temperature of the fuel cell stack is changed from about 0° C. to 40° C., purging a high flow rate for about 10 seconds, and then performing the cold start. Describing the change in the voltage of the fuel cell, as the pressure difference between the anode and the cathode is substantial (FIG. 5B), it may be appreciated that variability in the voltage is insignificant and voltage stability increases.

Figure 6A:
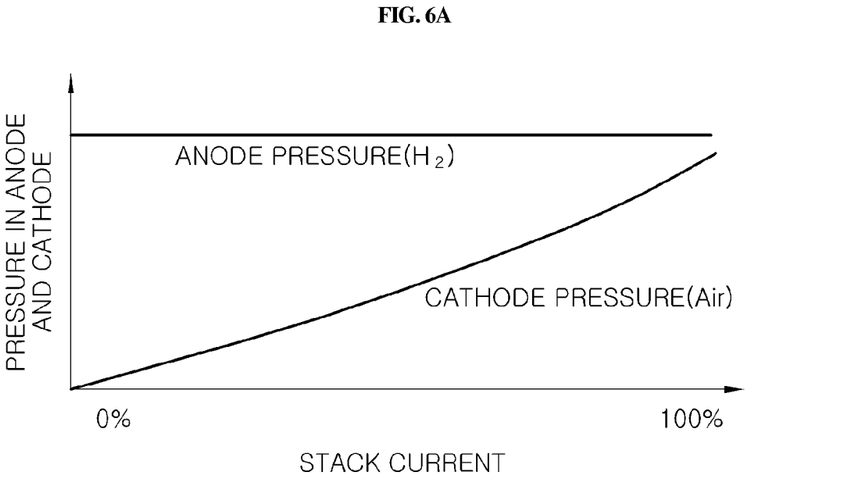
FIGS. 6A and 6B are exemplary graphs illustrating adjusting of an anode pressure according to an increase in a current of the fuel cell stack according to an exemplary embodiment of the present invention.
Figure 6B:
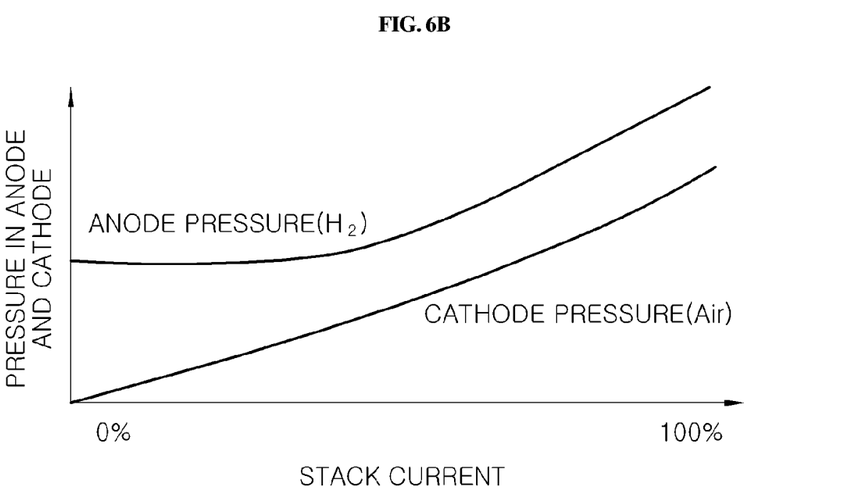

FIGS. 6A and 6B are exemplary graphs illustrating adjusting of an anode pressure according to an increase in a current of the fuel cell stack. FIG. 6A illustrates a pressure change when an allowable maximum pressure is used as the hydrogen pressure in the anode. This is a condition capable of deriving a maximum effect within a range in which airtightness stability of the fuel cell stack may be maintained. FIG. 6B illustrates when the hydrogen pressure in the anode is increased so that the difference between the air pressure in the cathode and the hydrogen pressure in the anode may be maintained in an equilibrium state by a predetermined pressure difference. This increase in the hydrogen pressure may be set by taking account of airtightness stability and membrane durability of the fuel cell stack.

FIGS. 7 to 11 are exemplary flowcharts illustrating a driving control method of a fuel cell system according to an exemplary embodiment of the present invention. For reference, when an exterior temperature of a fuel cell vehicle is about 0° C. such as during colder months, the driving control method of the fuel cell system according to an exemplary embodiment of the present invention may be performed in a condition which may enter a cold start mode since the temperature of the vehicle and the fuel cell stack decreases down to about 0° C. or less when the driving is stopped. The control method as described herein may be executed by a fuel cell controller.

When the temperature of the fuel cell stack is for example, about 30° C. or less after being cold started, the hydrogen pressure in the anode may be increased and maintained. Therefore, it may be possible to prevent the water generated from the cathode from being moved to the anode side and it may be possible to prevent a flooding state from being generated from the anode side and prevent an inverse voltage form being generated by moving the water in the anode to the cathode. Thereafter, even when a driving temperature is increased and the temperature of the fuel cell stack is increased to about 40° C. or greater, for example, the hydrogen pressure at the anode side may be increased and maintained. When the hydrogen pressure at the anode side is increased, the voltage of the fuel cell stack is decreased, such that output performance may be decreased, but the water at the anode side may be removed within a range in which fuel efficiency remains stable. Further, when the driving of the fuel cell vehicle is stopped, the hydrogen pressure at the anode side may again be increased. Accordingly, vapor emission quantity of the anode side may be increased and the remaining water in the anode may be moved to the cathode side.

Figure 7:
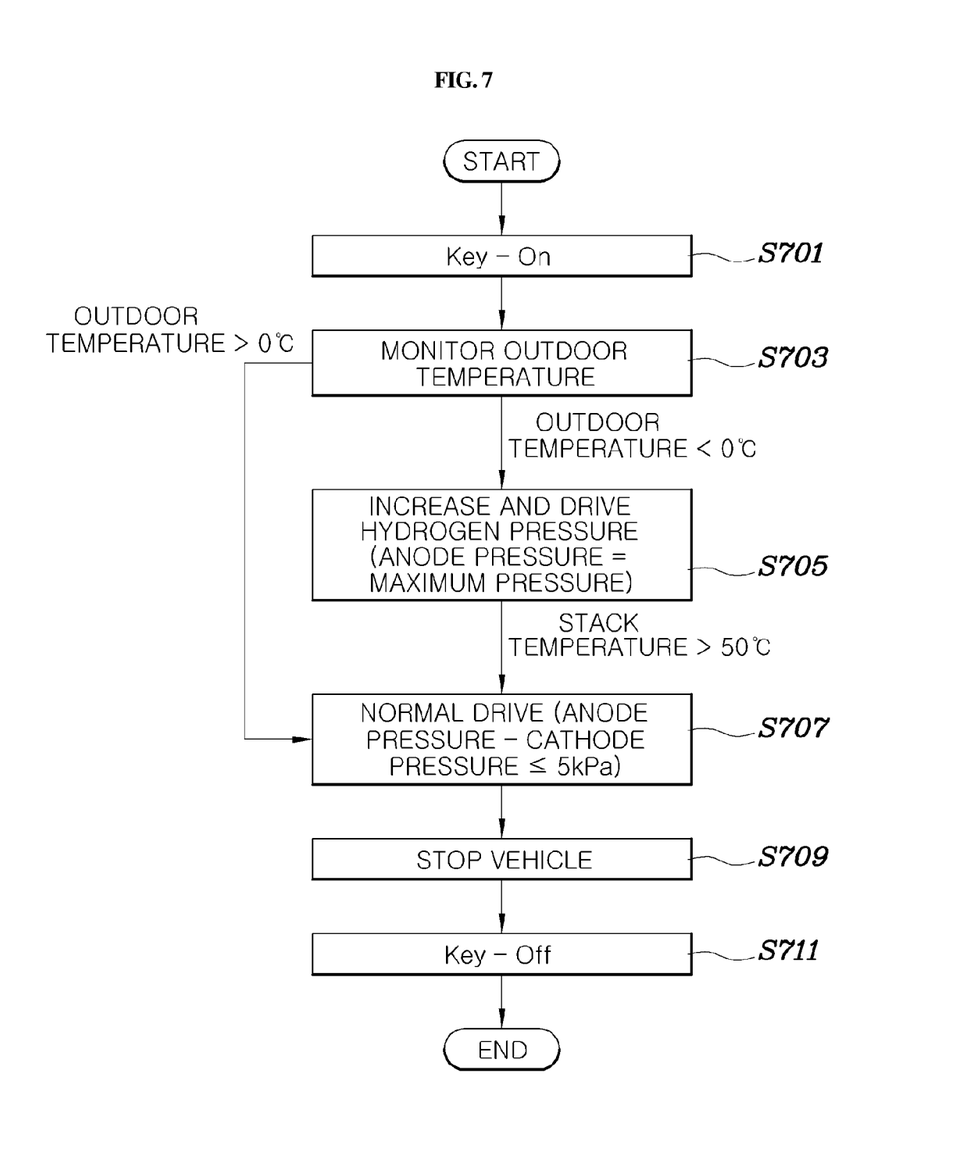
FIGS. 7 to 11 are exemplary flowcharts illustrating a driving control method of a fuel cell system according to an exemplary embodiment of the present invention.

FIG. 7 is an exemplary flowchart illustrating the driving control method of the fuel cell system according to an exemplary embodiment of the present invention. First, when the fuel cell vehicle is started (key—on) (S701), an exterior temperature may be monitored (S703). When the exterior temperature is less than a preset exterior temperature (e.g., about 0° C.) during the monitoring process, the hydrogen pressure at the anode side of the fuel cell stack may be increased to an allowable maximum value (S705). After the hydrogen pressure is increased (S705), when the temperature of the fuel cell stack exceeds a preset stack temperature (e.g., about 50° C.), a difference between the hydrogen pressure at the anode side and the air pressure at the cathode side may be adjusted to the preset pressure or less (S707). The vehicle may then be stopped (S709) and the starting may be turned off (key—off) (S711).

Figure 8:
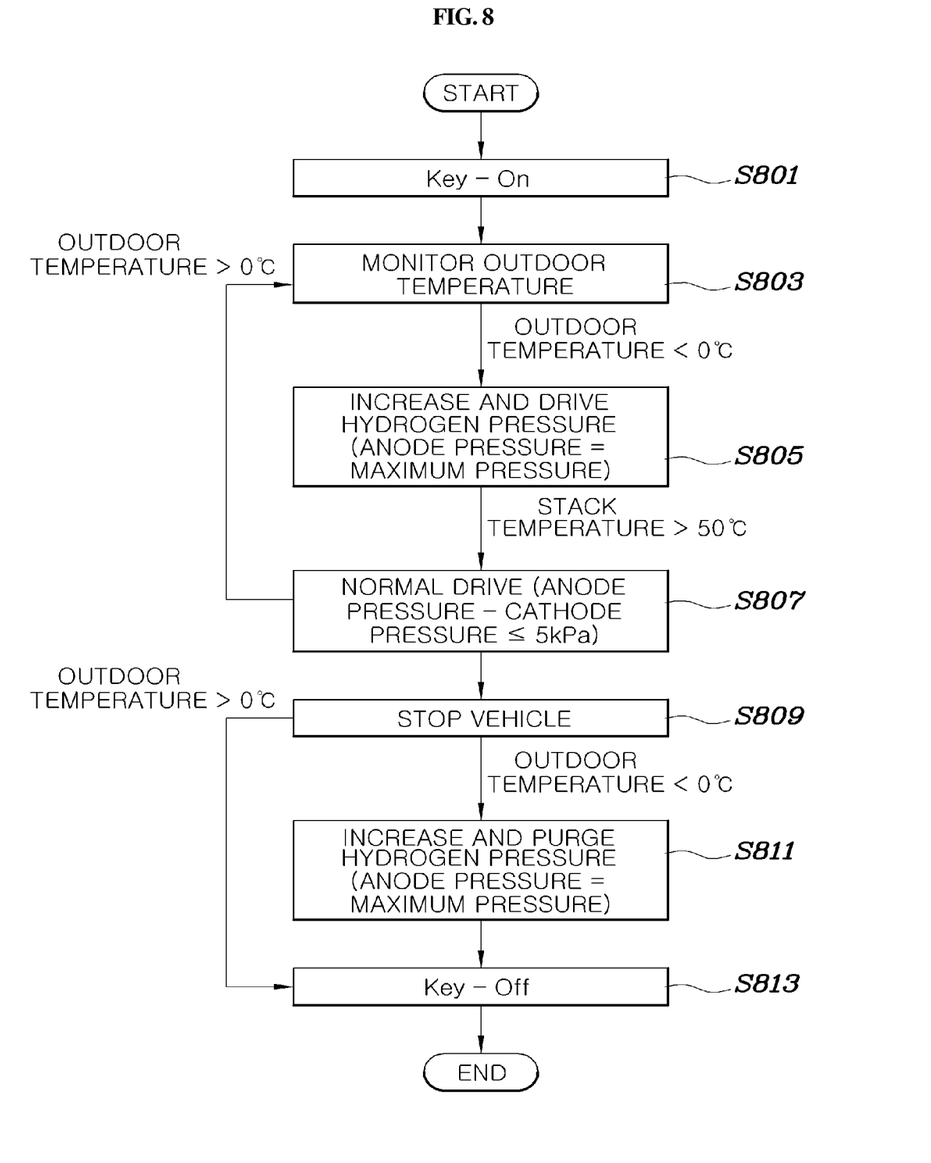

Since S801 to S809 of FIG. 8 are the same as S701 to S709 of FIG. 7, a description thereof will be omitted. Describing additional operations (S811 and S813) in FIG. 8, unlike FIG. 7, after the vehicle is stopped (S809), whether the exterior temperature of the vehicle is less than the preset outdoor temperature (e.g., about 0° C.) may be determined again. When the exterior temperature of the vehicle is greater than the preset exterior temperature, the starting may be turned off (key—off) (S813), and when the exterior temperature of the vehicle is less than the preset exterior temperature, the hydrogen pressure at the anode side of the fuel cell stack may be re-increased or increased again (S811). After the hydrogen pressure at the anode side is re-increased to the allowable maximum value, the starting may be turned off (S813). In other words, after the vehicle is stopped, the hydrogen pressure at the anode side may be increased, to thus increase the vapor emission quantity of the anode side and thus the water remaining at the anode side may be moved to the cathode side.

Figure 9:
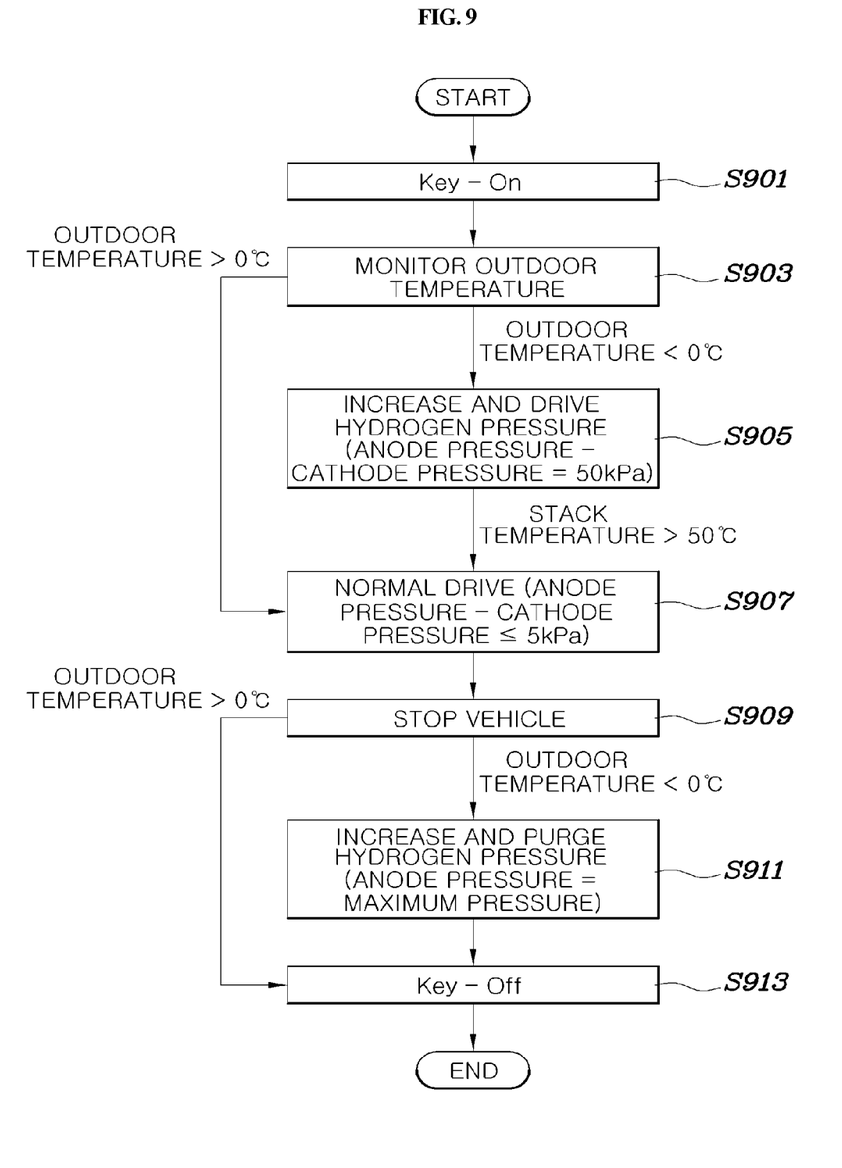

Since S901 and S903 of FIG. 9 are the same as S701 and S703 of FIG. 7, a description thereof will be omitted. When the exterior temperature is less than the preset exterior temperature (e.g., about 0° C.), the hydrogen pressure at the anode side may be increased. In particular, the hydrogen pressure may be increased to maintain the difference between the hydrogen pressure at the anode side and the air pressure at the cathode side to a preset first pressure (50 kPa) (S905). By maintaining a substantially constant difference between the hydrogen pressure at the anode side and the air pressure at the cathode side, the remaining water in the fuel cell stack may be removed while protecting electrolyte membrane damage which may occur based on a pressure difference between the anode and the cathode. Since the next operations (S907 to S913) correspond to S707, S709, S807, S809, S811, and S813 of FIGS. 7 and 8, a description thereof will be omitted.

Figure 10:
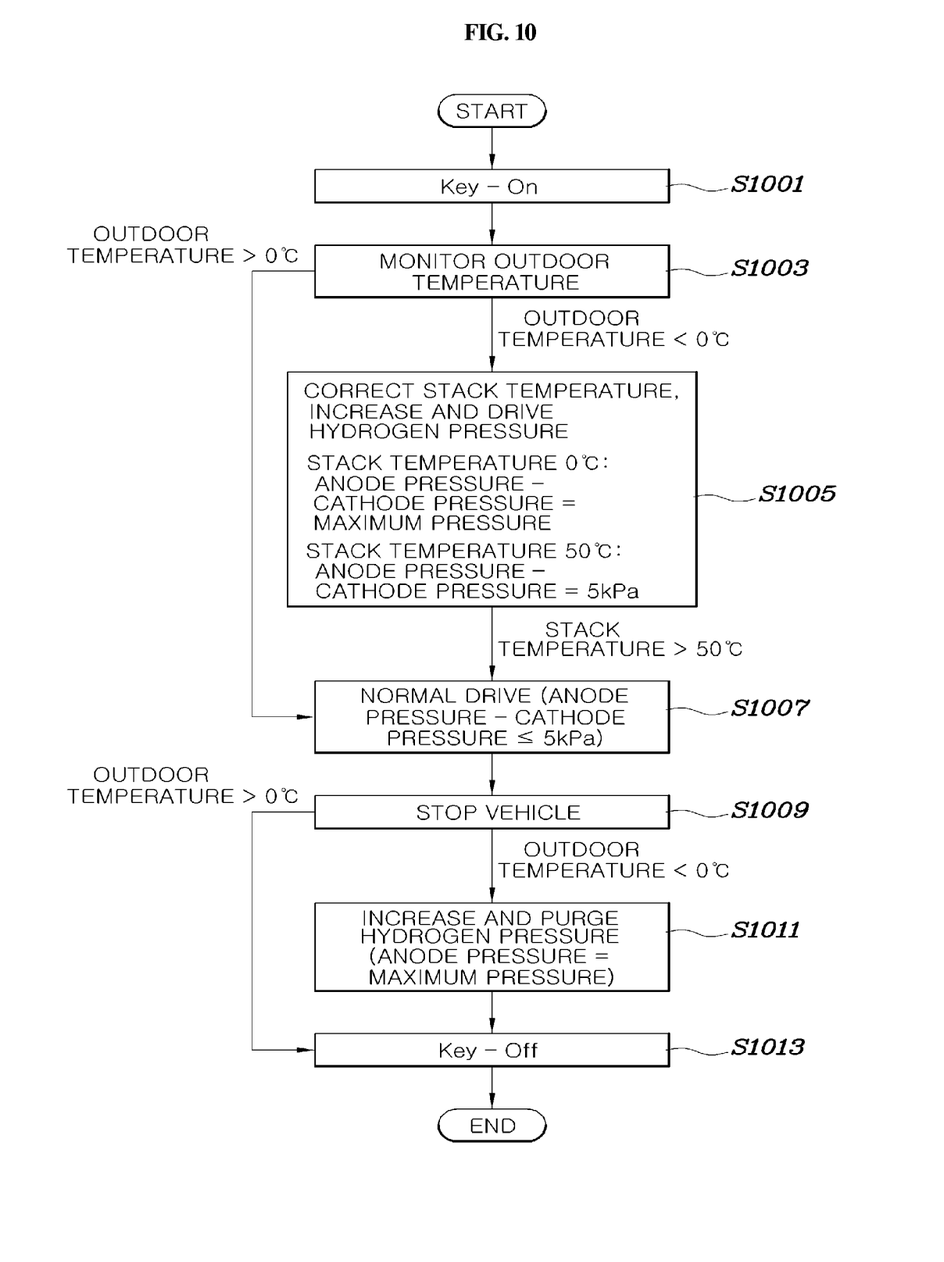

Since S1001 and S1003 of FIG. 10 are the same as S701 and S703 of FIG. 7, a description thereof will be omitted. When the exterior temperature is less the preset exterior temperature (e.g., about 0° C.), the hydrogen pressure at the anode side may be increased. In particular, the hydrogen pressure may be increased to change the difference between the hydrogen pressure at the anode side and the air pressure at the cathode side based on the temperature of the fuel cell stack (S1005). Specifically, the hydrogen pressure may be increased to decrease the difference between the hydrogen pressure at the anode side and the air pressure at the cathode side as the temperature of the fuel cell stack is increased. In addition, when the temperature of the fuel cell stack is less than the preset exterior temperature, the hydrogen pressure may be increased to cause the difference between the hydrogen pressure at the anode side and the air pressure at the cathode side to become the maximum value.

As illustrated in FIG. 10, when the temperature of the fuel cell stack is about 0° C., the difference between the hydrogen pressure at the anode side and the air pressure at the cathode side may become the allowable maximum value, and when the temperature of the fuel cell stack is about 50° C., the difference between the hydrogen pressure at the anode side and the air pressure at the cathode side may become about 5 kPa. In other words, as the temperature of the fuel cell stack is changed from about 0° C. to 50° C., the hydrogen pressure may be increased to decrease the difference between the hydrogen pressure at the anode side and the air pressure at the cathode side. Inversely, when the temperature of the fuel cell stack is substantially low, the hydrogen pressure at the anode side may be increased to the allowable maximum value, and as the temperature of the fuel cell stack is increased, the difference between the hydrogen pressure at the anode side and the air pressure at the cathode side may decrease linearly. A description of the next operations (S1007 to S1013) will be omitted, in the same manner of S907 to S913 of FIG. 9.

Figure 11:
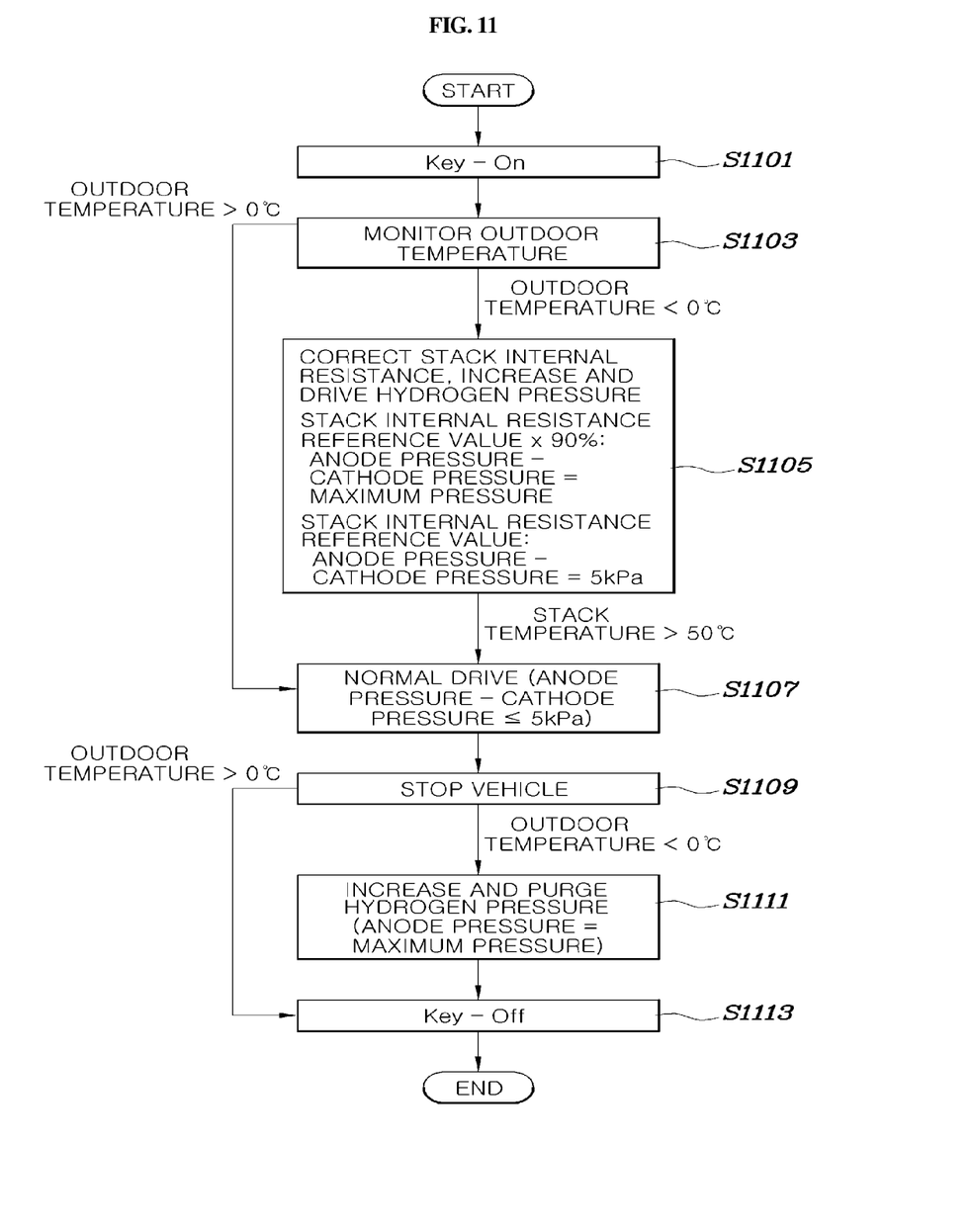

FIG. 11 illustrates an exemplary algorithm adjusting the difference between the hydrogen pressure at the anode side and the air pressure at the cathode side by considering the amount of remaining water in the fuel cell. Since S1101 and S1103 of FIG. 11 are the same as S701 and S703 of FIG. 7, a description thereof will be omitted. When the exterior temperature is less than the preset outdoor temperature (e.g., about 0° C.), the hydrogen pressure at the anode side may be increased. In particular, the hydrogen pressure at the anode side may be increased to change the difference between the hydrogen pressure at the anode side and the air pressure at the cathode side based on the internal resistance value of the fuel cell stack (S1105).

Specifically, the hydrogen pressure may be increased to increase the difference between the hydrogen pressure at the anode side and the air pressure at the cathode side as the internal resistance value of the fuel cell stack becomes lower than a preset reference internal resistance value. In addition, when the internal resistance value of the fuel cell stack becomes lower than the preset reference internal resistance value at a predetermined ratio or less, the hydrogen pressure may be increased to cause the difference between the hydrogen pressure at the anode side and the air pressure at the cathode side to become a maximum value.

Referring to FIG. 11, when the internal resistance value of the fuel cell stack becomes lower than the preset reference internal resistance value (e.g., a stack internal resistance reference value) at a predetermined ratio or less, the difference between the hydrogen pressure at the anode side and the air pressure at the cathode side may be set to the allowable maximum value. In addition, when the internal resistance value of the fuel cell stack is about equal to the preset reference internal resistance value (e.g., a stack internal resistance reference value), the difference between the hydrogen pressure at the anode side and the air pressure at the cathode side may become about 5 kPa. In other words, when the internal resistance value of the fuel cell stack is about equal to the preset reference internal resistance value, the hydrogen pressure may be adjusted to the difference between the hydrogen pressure at the anode side and oxygen pressure at the cathode side in a normal state, and the hydrogen pressure may be increased to increase the difference between the hydrogen pressure at the anode side and the air pressure at the cathode side as the internal resistance value becomes lower than the preset reference internal resistance value. A description of the next operations (S1107 to S1113) will be omitted similar to S907 to S913 of FIG. 9.

Numerical values illustrated in FIGS. 7 to 11 and described with reference to FIGS. 7 to 11 are not limited to the illustrated and described numerical values and may be changed based on a design process, an environmental change, and a difference in a technical level. In the driving control method of the fuel cell system according to the exemplary embodiment of the present invention, voltage stability may be maintained upon being entered the cold start mode, to thus improve cold start performance and cold driving performance. In other words, a temperature capable of performing the cold start may be decreased and a cold start completion time may be reduced.

After the start of the fuel cell vehicle is turned off, the amount of water present at the anode side of the fuel cell stack may be decreased to thus improve voltage stability. Catalyst damage due to carbon corrosion which may be caused during the cold start may be prevented. Cold start performance may be improved without separately attached parts. In addition, cold start performance may be improved without a separate change in fuel efficiency.

Although the present invention has been described with reference to the exemplary embodiments shown in the accompanying drawings, they are only examples. It will be appreciated by those skilled in the art that various modifications and equivalent other exemplary embodiments are possible from the present invention. Accordingly, an actual technical protection scope of the present invention is to be defined by the following claims.

What is claimed is:

1. A driving control method of a fuel cell system, comprising:
    monitoring, by a controller, an exterior temperature;
    increasing, by the controller, hydrogen pressure at an anode side of a fuel cell stack when the outdoor temperature is less than a preset exterior temperature during the monitoring process;
    adjusting, by the controller, a difference between the hydrogen pressure at the anode side and air pressure at a cathode side to a preset pressure or less when a temperature of the fuel cell stack is greater than a preset stack temperature; and
    re-increasing, by the controller, the hydrogen pressure at the anode side of the fuel cell stack when the exterior temperature is less than the preset exterior temperature when a fuel cell vehicle is stopped.

2. The driving control method of claim 1, wherein in the increasing of the hydrogen pressure, the hydrogen pressure at the anode side is increased to an allowable maximum value.

3. The driving control method of claim 1, wherein in the re-increasing of the hydrogen pressure, the hydrogen pressure at the anode side is re-increased to an allowable maximum value.

4. The driving control method of claim 1, wherein in the increasing of the hydrogen pressure, the hydrogen pressure at the anode side is increased to maintain the difference between the hydrogen pressure at the anode side and air pressure at a cathode side to a preset first pressure.

5. The driving control method of claim 1, wherein in the increasing of the hydrogen pressure, the hydrogen pressure at the anode side is increased to change the difference between the hydrogen pressure at the anode side and air pressure at a cathode side based on a temperature of the fuel cell stack.

6. The driving control method of claim 5, wherein in the increasing of the hydrogen pressure, the hydrogen pressure is increased to decrease the difference between the hydrogen pressure at the anode side and the air pressure at the cathode side as the temperature of the fuel cell stack is increased.

7. The driving control method of claim 5, wherein in the increasing of the hydrogen pressure, the hydrogen pressure is increased to cause the difference between the hydrogen pressure at the anode side and the air pressure at the cathode side to become a maximum value when the temperature of the fuel cell stack is less than the preset stack temperature.

8. The driving control method of claim 1, wherein in the increasing of the hydrogen pressure, the hydrogen pressure at the anode side is increased to change the difference between the hydrogen pressure at the anode side and air pressure at a cathode side based on an internal resistance value of the fuel cell stack.

9. The driving control method of claim 8, wherein in the increasing of the hydrogen pressure, the hydrogen pressure is increased to increase the difference between the hydrogen pressure at the anode side and air pressure at a cathode side as the internal resistance value of the fuel cell stack becomes lower than a preset reference internal resistance value.

10. The driving control method of claim 8, wherein in the increasing of the hydrogen pressure, the hydrogen pressure is increased to cause the difference between the hydrogen pressure at the anode side and air pressure at a cathode side to become a maximum value when the internal resistance value of the fuel cell stack becomes lower than a preset reference internal resistance value at a predetermined ratio or less.

11. A driving control system of a fuel cell system, comprising:
    a memory configured to store program instructions; and
    a processor configured to execute the program instructions, the program instructions when executed configured to:
        monitor an exterior temperature;
        increase hydrogen pressure at an anode side of a fuel cell stack when the outdoor temperature is less than a preset exterior temperature during the monitoring process;
        adjust a difference between the hydrogen pressure at the anode side and air pressure at a cathode side to a preset pressure or less when a temperature of the fuel cell stack is greater than a preset stack temperature after increasing the hydrogen pressure; and
        re-increase the hydrogen pressure at the anode side of the fuel cell stack when the exterior temperature is less than the preset exterior temperature when a fuel cell vehicle is stopped after adjusting the difference.

12. The system of claim 11, wherein in the increasing of the hydrogen pressure, the hydrogen pressure at the anode side is increased to an allowable maximum value.

13. The system of claim 11, wherein in the re-increasing of the hydrogen pressure, the hydrogen pressure at the anode side is re-increased to an allowable maximum value.

14. A non-transitory computer readable medium containing program instructions executed by a controller, the computer readable medium comprising:
    program instructions that monitor an exterior temperature;
    program instructions that increase hydrogen pressure at an anode side of a fuel cell stack when the outdoor temperature is less than a preset exterior temperature during the monitoring process;

program instructions that adjust a difference between the hydrogen pressure at the anode side and air pressure at a cathode side to a preset pressure or less when a temperature of the fuel cell stack is greater than a preset stack temperature after increasing the hydrogen pressure; and program instructions that re-increase the hydrogen pressure at an anode side of the fuel cell stack when the exterior temperature is less than a preset exterior temperature when a fuel cell vehicle is stopped after adjusting the difference.

* * * * *